United States Patent Office 3,325,123
Patented June 13, 1967

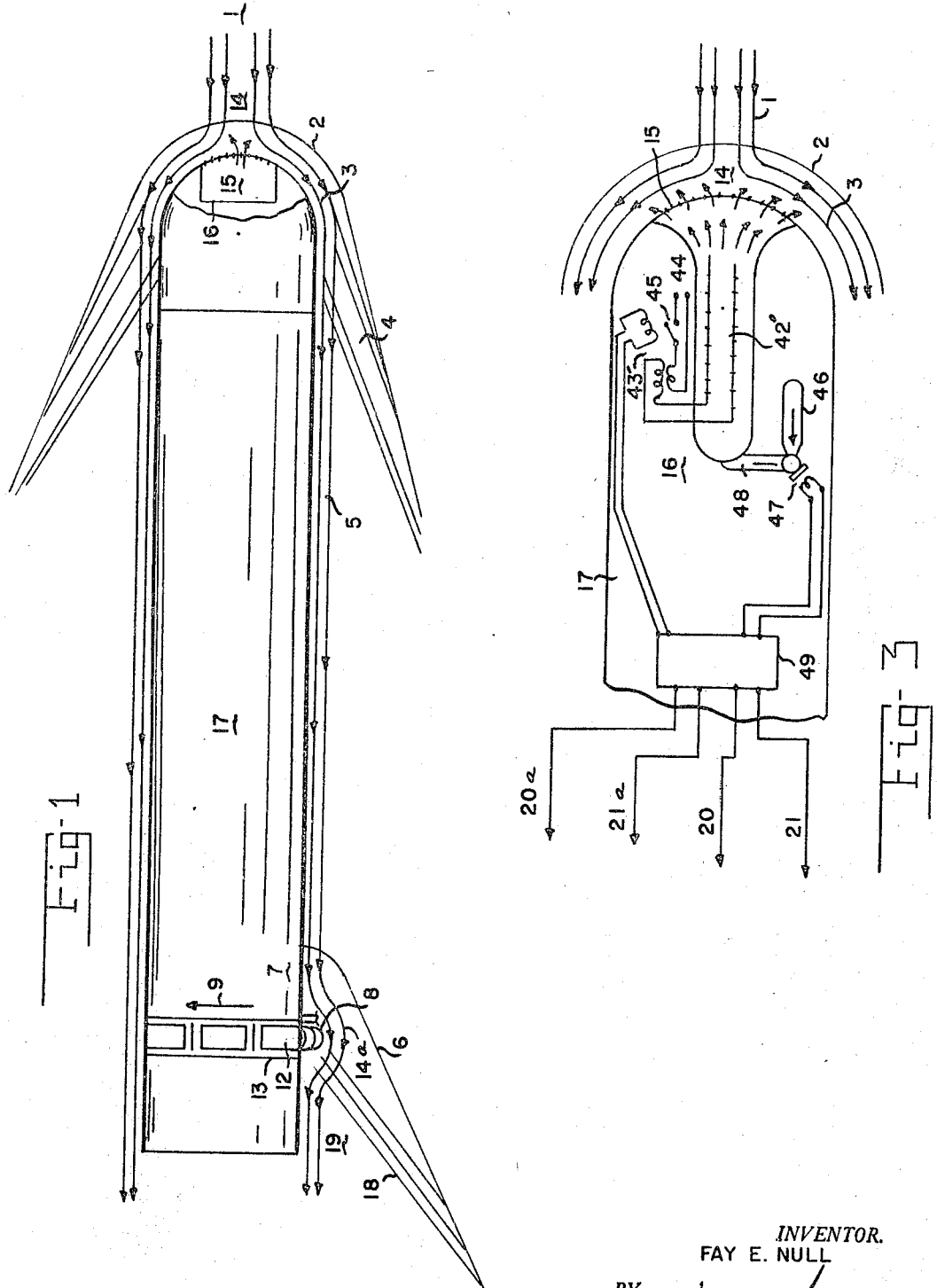

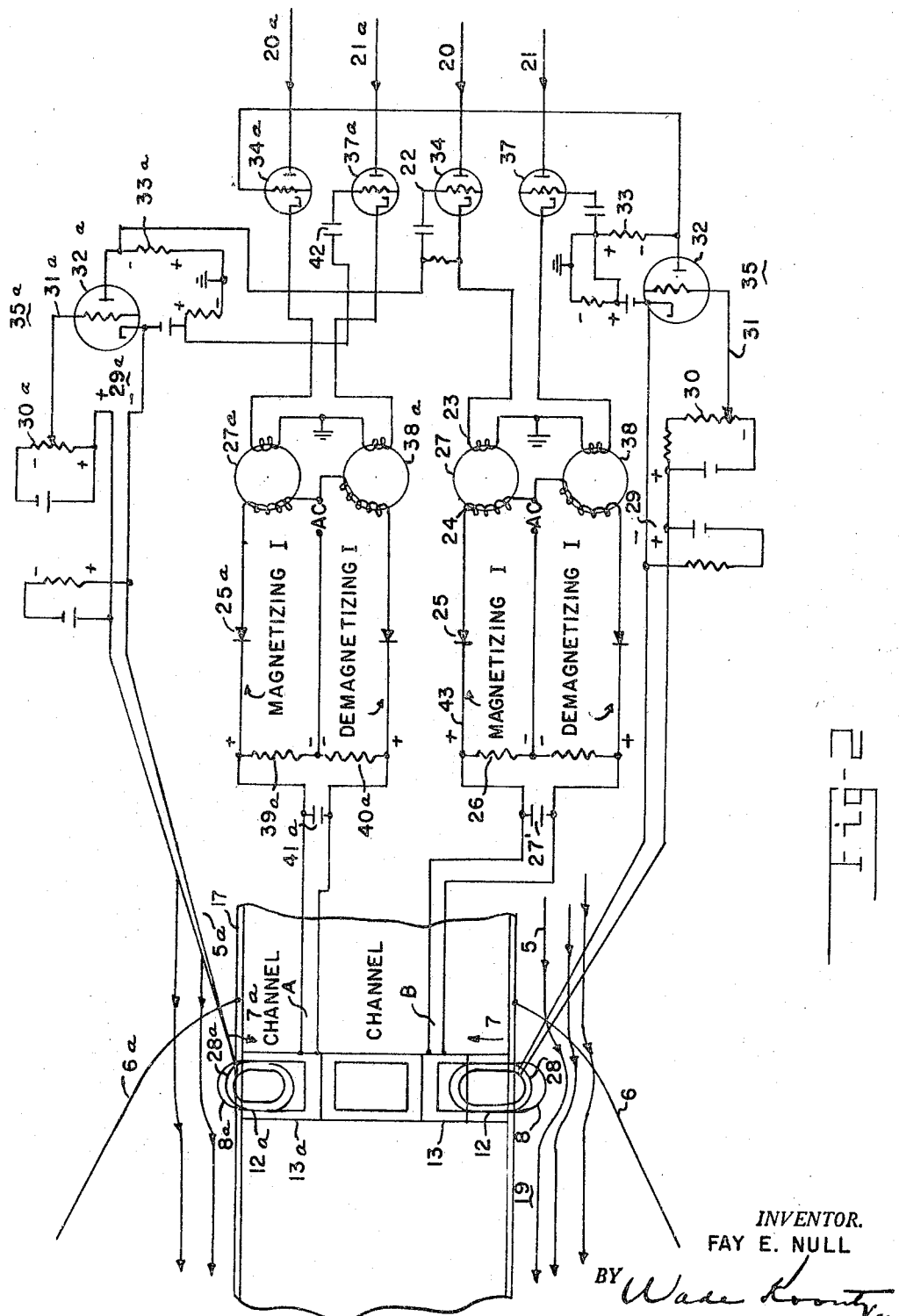

3,325,123
MAGNETOHYDRODYNAMIC CONTROL
Fay E. Null, Shalimar, Fla., assignor to the United States of America as represented by the Secretary of the Air Force
Filed May 19, 1961, Ser. No. 111,402
11 Claims. (Cl. 244—77)

The invention described herein may be manufactured and used by or for the United States Government for governmental purposes without payment to me of any royalty thereon.

This invention pertains to a magnetohydrodynamic control for bodies that are airborne at supersonic speed, re-entrant bodies into the earth's atmosphere, and the like.

Controls for the orientation of high velocity, re-entry bodies into the earth's atmosphere must be rapid and accurate and must avoid excessive temperature rise and pressure loading that might result in mechanical failure. Drag flaps extended perpendicularly to the rear surface of re-entry bodies become excessively hot and present a difficult cooling problem. The substitution of a laterally extending magnetic field as is disclosed herein for a mechanical brake gives a more rapid variable control with less aerodynamic heating than prior devices.

A background for imparting a clear understanding of the present invention as claimed is provided by Series XI Plasma Physics and Thermonuclear Research, vol. I, by Longmire, Tuck, and Thompson, published by Pergamon Press, New York, 1959; Magnetohydrodynamic Shocks, Physical Review, volume 80, page 692, published in 1950; Industrial Electronics Handbook, by Cockvell, volume 2, pages 195 and 197, published by McGraw-Hill Book Company, New York, N.Y.; The Encyclopedia of Chemistry (Supplement) by G. L. Clark and G. G. Hawley, published in 1958 by Reinhold Publishing Corporation, New York, N.Y., pages 225–230; and Magnetic Amplifiers, Navships 90D,172, published in 1954 by the Department of the Navy, Bureau of Ships, 18th St. and Constitution Ave., Washington 25, D.C. A preliminary search has located the United States Letters Patent: 2,856,142 issued to R. P. Haveland, Oct. 14, 1958; 2,805,032 issued to T. Davis, Sept. 3, 1957; 2,504,137 issued to W. L. Lewis, Apr. 18, 1950; 2,400,388 issued to R. G. Campbell, May 14, 1946; 2,158,180 issued to R. H. Goddard, May 16, 1939; and 1,879,187 issued to R. H. Goddard, Sept. 27, 1932.

The nature, the substance and the object of this invention as it is claimed is the provision of flight directional and braking controls for an airborne missile or flight vehicle that do not extend out beyond the aerodynamic surface, minimizing aerodynamic heating and with more rapid, accurate control, that may be actuated by autopilot signals that initiate magnetic fields and plasma sources as required.

The object of the invention is to provide sensitive, accurate and non-projecting means for slowing down and for directing the flight pattern of a body in flight as it leaves outer space and enters the atmospheric envelope that surrounds the earth or for related use as is needed.

In the accomanying drawings:

FIG. 1 is a schematic side elevational view of a body and the patterns of atmospheric waves around the body;

FIG. 2 is an electronics schematic diagram of circuits actuated from the aircraft's autopilot within the body in FIG. 1 shown in a side elevational fragmentary view, and the circuitry shown controlling magnetic fields that serve to lower the velocity of the body and also to influence its direction of flight; and FIG. 3 is a schematic side elevational fragmentary view of the nose of the body in FIG. 1.

FIG. 1 is a schematic diagram of the surface outline of a re-entry body 17 with a plasma injection source 16 that is sometimes required to augment the natural ion sheath of air that flows along the body 17, and the controlled magnetic fields at the rear end of the body 17, that are energized from magnetic field sources positioned within the body 17.

The re-entry body 17 is shown in FIGS. 1 and 3, at zero angle of attack with the free stream air flow at 1 passing through normal air shock 2, to a relatively high pressure region 3, and to expansion waves 4 and to the air flow region 5 along the side of the body 17 where the air inside the boundary layer is hot due to its decrease in velocity.

The air flow outside the boundary layer is hotter than the free stream of air at 1 because of the irreversible compression in passing through the shock 2. At high Mach numbers the heating of the air is sufficient to produce and to maintain ionization of the air in the region 5. Under certain marginal conditions, such as the very low density of air at extremely high altitudes or for lower Mach numbers, the amount of the ionization of air in the region 5 may not be sufficient to produce the required control shock waves and turning torque. The plasma generator or the plasma source 16 in the leading front end of the body 17 is provided to add the required additional ions. The plasma source 16 ejects ions through its grid 15 into the air flow at the region 14.

At the rear of the re-entry body 17 there are illustratively four quadrant sections and at each quadrant section a magnetic field 8 protrudes laterally into the air flow from a U-shaped magnetic core 12 and a coil 13. The components of the air deflecting magnetic field 8 that are perpendicular to the surface of the body 17 slow down the flow of ionized air in the region 5 with the formation of the shock front 6 normal to the surface of the body 17, the high pressure region 7, the deflected, subsonic flow of air at 14a around the magnetic field 8 which phenomena are accompanied by expansion waves 18, and a wake flow in the region 19. The relatively high pressure region 7 between the shock front 6 and the air deflecting magnetic field 8, exerts a strong upward force on the body 17 and provides a quick control over its direction. The strong upwardly directed force on the trailing rear end of the re-entry body 17 causes the arrow indicated strong orientating torque 9, that rotates the rear of the re-entry body upward.

The component of a magnetic field perpendicular to the velocity of a charged particle produces a force on the particle perpendicular to the field and the velocity. The particle rotates in a circle of radius $r$. A charge of the opposite sign has the same circular path radius but rotates in the opposite direction. Flux from a north pole rotates clockwise whereas a charge of opposite sign rotates counterclockwise. Charges of both positive and negative signs reverse their directions of rotation when the magnetic field reverses its sign. The circular paths of the charged particles have zero average forward velocity, act as an obstacle and cause a normal shock. Ions pile up on the magnetic field. At every collision an ion in the collision is either slowed down or is speeded up. If the ion is slowed down, its radius of curvature becomes smaller. If the ion is speeded up its radius of curvature increases in length. The pileup of ions on the magnetic field produces an obstacle to the flow of neutral molecules as a normal shock wave.

Near stagnation temperature is approached at position 11 in front of the magnetic field 8. A mechanical brake would require special cooling to prevent its burning up under comparable service but the deflected subsonic air flow 14a around the magnetic flux or field 8 is directed away from the surface of the re-entry body 17 with marked reduction in aerodynamic heating.

FIG. 2 is a schematic fragmentary diagram showing an enlarged rear portion of the re-entry body 17 with shock waves of different strength produced by controlled magnetic fields in quadrant sections on opposite sides of the axis of the body. The circuitry in FIG. 2 is actuated from an autopilot 49 in FIG. 3 to control through circuit current branches both magnetizing and demagnetizing currents for variations of the control magnetic fields from a maximum to zero by the aid of field detection loops that are placed over U-shaped cores with the resultant structures flush with the aluminum skin of the body 17.

At the bottom side of the rear of the re-entry body 17 in FIG. 2 the channel B has supplied a full magnetizing current to the coil 13 and to the core 12 to provide a full strength magnetic field 8 that produces the shock 6 that is normal at the surface of the body 17, and that provides a relatively large high pressure region at 7 for a control torque as indicated by the upwardly directed arrow that is adjacent to the numeral 7.

The opposite magnetic field section of the coil 13a and core 12a only has a median current from the channel A as controlled by the autopilot 49, so that the air shock 6a, although normal to the surface of the body 17, rapidly changes shape and has a relatively small high pressure region at 7a indicated by a downwardly directed arrow, for a torque that is opposite in direction to that for the channel B.

In one mode of operation, when no corrective guidance is required, the deflecting magnetic fields 8 and 8d are normally both zero, the autopilot 49 initially actuating one or the other to give the required deflection. But after, say field 8 has been actuated, means are provided as hereinafter described, to prevent the opposite control field 8a from being actuated until the residual magnetic field 8 has been erased, only one of the oppositely paired fields being on at one time.

If the autopilot 49 calls for an upward rotation of the rear of the re-entry body 17, a positive voltage is put on the lead 20, which in the absence of a magnetic flux at 8a on the channel A and no blocking voltage on the grid 22 of the tube 34, passes a direct current through the primary coil 23 of the magnetic amplifier 27, to permit current flow through the secondary coil 24, the rectifier 25, and the resistor 26, and giving a voltage across the condenser 27' and the coil 13 of the polarity of the resistor 26 that causes an increased magnetic field 8 and thereby supplies the upwardly directed rotation of the rear end of the re-entry body 17.

However, if at the time the autopilot 49 calls for a clockwise torque, the bismuth coil, magnetic field detector 28a indicates the presence of a field by its increased resistance, with an increased value of voltage at 29a, that is larger than the biasing battery reference voltage 30a that reverses the residual flux, with a positive voltage on the grid 31a of the regulating tube 32a, and a negative voltage pickoff from the resistor 33a, then this negative voltage on the grid 22 of the tube 34 blocks the flow of current from the lead 20 as long as the flux at the magnetic field 8a is appreciably above zero. This permits the signal for increased positive clockwise torque to first reduce the counterclockwise torque at 8a before the clockwise torque at 8 is increased.

Signal from the autopilot for clockwise torque, in the absence of flux at the magnetic field 8 and hence with no negative voltage from the resistor 33 of the detector circuit 35 to block the tube 34a, also decreases any voltage on the lead 20a and puts a somewhat smaller magnitude increase in voltage on the lead 21a, these voltage increments being proportional to the error voltage between the autopilot demand and the body orientation. The decrease in the current through the tube 34a and the increase in the current through the tube 37a, which are so connected to the magnetic amplifiers 27a and 38a that the rectified outputs oppose in the polarity at the resistors 39a and 40a, are with a decreased positive voltage across the top of the condenser 41a, and with a decrease in the magnetic flux 8a from the coil 13a.

If the autopilot demand for clockwise torque continues, the voltage on the lead 20a is reduced to zero, the current polarity through the coil 13a then being determined by the polarity on the resistor 40a is reversed in polarity with a demagnetizing action that continues with continued autopilot demand until the magnetic field at 8a is reduced to zero. The flux detector circuit 35a then has sufficient negative voltage on the grid 31a to block the regulating tube 32a. The voltage at the condenser 42 then biases the tube 37a to cutoff to prevent continued demagnetizing current from the lead 21a causing a reversed air deflecting flux or magnetic field at 8a, and the negative bias on the tube 34 is removed. The control current on the lead 20 is passed so that the magnetizing current 43 can pass through the coil 13 and produce an increasing magnetic field at 8.

It is not necessary for the magnetic field to be reduced exactly to zero as a small additional drag not needed for altitude control is not detrimental. The stability of voltage balance adjustments in the above circuits is thus not critical.

Autopilot demand for a counterclockwise torque starts with the same conditions as for the clockwise torque but with reversed channels. The above control circuit is necessary if the maximum orientation torque is to be obtained for a given magnetizing current and ion concentration. If in a given application, the maximum torque is not required and an increased drag is beneficial, the demagnetizing circuits may be eliminated, as the autopilot demand for torque merely increases the magnetizing current on one side and decreases it on the other.

FIG. 3 is a schematic drawing that illustrates the injection of plasma into the air flow field around the nose of the re-entry body 17 to increase the ion concentration and the bluntness of the air shock front 6 at the magnetic field at the rear of the body 17. The re-entry body 17 has the normal shock 2, which deflects the free stream air flow 1 around the nose of the body 17.

The plasma generator 16 consists of the glow or corona discharge electrodes 42', the transformer 43', the voltage source 44, and the autopilot controlled switch 45. The high pressure tank 46 supplies air through the relay controlled expansion valve 47, into the connecting tube 48 to the connecting tube 48', to flow past the electrodes 42' and out through the grid 15.

If the trajectory of the re-entry body 17 is such that the control torque is not sufficient for the rapid change in control required, and there is a resultant error signal from the autopilot 49 that exceeds a set value, then the autopilot 49 actuates the plasma generator 16 by closing the switch 45 to make the power connection and with the same operation opening the valve 47 for air flow. When the error signal of the autopilot 49 has been reduced below a small set value, the plasma generator 16 is turned off by opening the switch 45 and closing the valve 47.

It is to be understood that the apparatus and the circuitry of the invention that is described herein may be modified somewhat within the scope of the invention.

I claim:

1. A magnetohydrodynamic directional control for an airborne body having a surface and having a front end and a rear end, the body comprising a U-shaped magnetic core positioned inwardly of and adjacent the surface near the rear end of the body, a magnetic field core supporting the core, and circuitry selectively energizing the core and coil for establishing a magnetic field that projects to outside of the body surface and substantially perpendicular thereto for slowing down air flow along the surface passing the magnetic field and altering the direction of flight of the airborne body.

2. The control defined in the above claim 1 wherein pairs of the core and coil are mounted on diametrically opposite sides near the rear end of the body for purposes of affecting the directional flight course thereof.

3. The control defined in the above claim 2 wherein each core and coil is energized for erecting an air deflecting magnetic field outisde of the body at the rear end thereof and is deenergized for collapsing the air deflecting magnetic field by a channel of circuitry within the body.

4. The control defined in the above claim 1 wherein the core and coil are mounted within the body and adjacent the rear end thereof and wherein airflow along the surface of the body is modified by the injection of plasma thereinto at the front end of the body from a plasma generator comprising a plurality of corona discharge electrodes, a transformer supplying current to the electrodes, a voltage source supplying a voltage to the transformer, an energizing switch connecting the voltage source to the transformer, a high pressure tank supplying air through a relay controlled expansion valve through a connecting tube to a conducting tube where the conducted air permeates the electrodes as plasma, and a plasma grid at the front end of the body feeding the plasma into the air stream incident thereto axially of the body and against the direction of the air flow against the front end of the body.

5. In a magnetohydrodynamic control for airborne supersonic bodies, an airborne body, an ionized airflow ejecting means delivering ionized air directed against air incident to the forward end of the airborne body for flowing outwardly along the body, a plurality of separately actuated electromagnetic directional control means sections terminating the rear of a supersonic body, variable magnetic fields disposed at the rear of the body and regulated in flux density and magnitude by said control means sections and said fields having available a large component perpendicular to the lateral surface of said body in projecting outwardly therefrom and on being energized being capable of developing a normal air shock wave produced in front of said field at the body surface by the interaction of said field and the ionized airflow around said body in changing the flight path thereof and a high pressure region produced downstream of said air shock wave and in front of said field that gives a powerful and controlled lift and torque for orientation of said body together with a high temperature and near stagnation flow around said field and away from the surface of said body with a marked reduction in heat flow to said body.

6. In a magnetohydrodynamic control over the direction of flight of an airborne body having an autopilot for directing the flight path thereof, a plurality of electromagnets having cores provided with ampere turns positioned at the rear of the body beneath the surface skin thereof and said cores arranged in quadrant sections for the purpose of controlling the direction of flight of the body, electromagnet core energizing controls actuated by the autopilot of said body to produce and control variable magnetic fields by the core ampere turns coupled with said cores and said magnetic fields having large components perpendicular to and extending outwardly of the rear surface of said body adequately to maintain normal air shock waves produced in front of said magnetic fields at the surface of said body by the interaction of said field and an ionized flow around said body with high pressure areas produced downstream of said shocks and in front of said fields that give powerful and controlled lift and torque for orientation of said body and characterized by a flow of high temperature and near stagnation flow around said field and maintaining a heat flow away from the surface of said body with a marked reduction in heat flow from the air to said body.

7. In a magnetohydrodynamic directional control of an airborne supersonic body provided with an autopilot for directing the flight path thereof, electromagnetic control means at the rear and beneath the surface of the supersonic body separated in sections such as quadrants for control purposes of producing and regulating variable magnetic fields with said fields having large components perpendicular to and extending outwardly from the lateral surface of said body for the production of normal shock waves of air in front of said magnetic fields by the interaction of said fields and an ionized airflow around said body, a plasma generator that ejects a partially ionized flow of gas into and against the direction of the airflow lines around the nose of said body upon activation by the autopilot of said body in producing high pressure regions downstream of said shock and in front of said magnetic fields in providing powerful and controlled lift and torque for orientation of said body and inclusive of a flow of high temperature and near stagnation flow around said field and away from the surface of said body with a marked reduction in heat flow from the air to said body.

8. In a magnetohydrodynamic control of the flight path of an airborne supersonic body in response to signal from an autopilot disposed therewithin, a plurality of electromagnets having cores provided with ampere turns and positioned inside the surface of and at the rear of the supersonic body with said cores being U-shaped in cross section and following the lateral periphery of said body and being arranged in sections such as quadrants for control purposes, variable magnetic fields produced and controlled by the ampere turns coupled with said cores by the electromagnet coils actuated by the autopilot of said body and said magnetic fields having large components extending perpendicular to and projecting beyond the surface of said body for adequately producing normal shock waves disposed in front of said magnetic fields by the interaction of said fields into an ionized airflow around said body such that high pressure regions are produced downstream of said shocks and in front of said fields that give powerful and controlled lift and torque for orientation of said body in directing the flight path thereof together with high temperature near stagnation airflows around said fields and away from the surface of said body with a marked reduction in heat flow from the air to said body.

9. In a magnetohydrodynamic control of the flight path of an airborne supersonic body in response to signal from an autopilot positioned within the body, a plurality of electromagnets having cores with ampere turns and positioned below the surface of and at the rear of the supersonic body with said cores being U-shaped in cross section and following the lateral periphery of said body and arranged for control purposes in sections such as quadrants and adapted for providing variable magnetic fields controlled by the ampere turns coupled with said cores as determined by the electromagnet coils actuated by the autopilot of said body such that said magnetic fields have a substantially large component perpendicular to the surface of and extending outside of said body for producing normal shock air waves in front of said magnetic fields at the surface of said body in and intercepting an ionized airflow along the outside of said body, a plasma generator within and opening axially through the front of said body for ejecting a partially ionized gas into and against the direction of the airstream flow to augment the ions produced by aerodynamic temperature rise and said plasma generator comprising a high pressure gas tank, an expansion valve actuated by signals from the autopilot, an ionizing chamber containing arrays of corona glow discharge points that are connected to a high voltage circuit, a grid containing openings in the front end surface of said body for the ejection of plasma into and against the direction of the airstream flow such that relatively high pressure regions are produced downstream of said shocks and in front of said magnetic fields that give a powerful and controlled lift to the airstream and torque for the orientation of said body together with a high temperature near stagnation flow around said magnetic fields and away from the surface of said body with a marked reduction in heat flow from the airflow to said body.

10. In a magnetohydrodynamic control of the flight path of an airborne supersonic body in response to signal from an autopilot within the body, electromagnetic control means positioned beneath the surface near the rear of the supersonic body and separated into sections such as quadrants for activation by said control means in producing and regulating variable magnetic fields with large components perpendicular to the surface of and extending outside of said body in producing normal shock air waves in front of said magnetic fields by the interaction of said fields and the ionized airflow around said body such that a high pressure region is produced downstream of said shocks and in front of said fields that give powerful and controlled lift and torque for orientation of said body and high temperature with near stagnation airflow around said fields and away from the surface of said body with a marked reduction in heat flow from the air to said body, an electronic control circuit for maintaining the regulation of said magnetic fields comprising a separate channel from the autopilot for each control section and each channel consisting of two branches identified as a magnetizing current branch and a demagnetizing current branch with a magnetic amplifier and a rectifier in each branch such that the rectified and magnetic amplifier output from each branch is controlled in magnitude by separate currents from the autopilot and with each branch in each channel of a polarity that is opposite to the other branch in the same channel and with the branch outputs in each channel connected in series such that the resultant voltages are impressed across the coils of said electromagnetic means for the production of said magnetic fields modified by an autopilot error signal as difference between autopilot demand and body orientation for reduction of the current in the magnetizing branch by a rate proportional to the error and a somewhat larger rate of increase of the demagnetizing current until the magnetic field for the given section is reduced to zero, a magnetic field detection circuit using the change in resistance of a coil in one of the magnetic fields to overcome a reference voltage in the circuit and to bias out an electronic element in series with said demagnetizing current branch when said magnetic field reaches zero and to unblock the magnetizing branch of the section opposite to that of said first control section with reversal of this action when a field again appears at the first control section and with prevention of reversal of magnetic fields by control currents of opposite polarity to the sign of the body orientation obtained.

11. In a magnetohydrodynamic control of the flight path of an airborne supersonic body in response to signal from an autopilot inside of the body, electromagnetic control means positioned beneath the surface near the rear of the supersonic body and separated into sections such as quadrants for body direction control purposes by means of variable magnetic fields with large components perpendicular to and projecting outside of the lateral surface of said body and said fields being produced and regulated in sectors actuated by said control means in forming and maintaining normal shock air waves disposed in front of said magnetic fields at said body surface by the interaction of said fields and an ionized airflow along said body together with a relatively high pressure air region produced downstream of said shock waves and in front of said fields and that give a powerful and controlled lift and torque for the orientation of said body such that a high temperature and near stagnation flow around said fields and away from the surface of said body with a marked reduction in heat flow from the air to said body and responsive to an autopilot rate detector error signal, and a plasma generator at the front end of the body actuated by autopilot signal to eject a partially ionized gas into and against the flow direction of the airstream flow incident to the front end of the body to augment the ions produced by the aerodynamic temperature rise in the air at the leading end of said body.

References Cited
UNITED STATES PATENTS 2,946,541    7/1960    Boyd _____ 244—130

FOREIGN PATENTS 635,784    4/1950    Great Britain.

FERGUS S. MIDDLETON, *Primary Examiner.*